United States Patent [19]
Burchfield

[11] Patent Number: 5,752,432
[45] Date of Patent: May 19, 1998

[54] EXPANDABLE VOLUME FOOD PREPARATION AND FORMING TOOL APPARATUS AND METHOD

[76] Inventor: Charles C. Burchfield, 15122 134th Ave. E., Puyallup, Wash. 98374

[21] Appl. No.: 885,218

[22] Filed: Jun. 30, 1997

[51] Int. Cl.$^6$ .............................. A47J 43/18; A47J 43/28; A22C 7/00; A23P 1/00
[52] U.S. Cl. ............................ 99/426; 30/316; 30/325; 99/353; 99/428; 99/430; 99/439; 425/470; D7/672; 249/117; 249/DIG. 1
[58] Field of Search ................ 99/426, 427, 430–433, 99/428, 439, 353–355; 30/316, 325, 123.3; 249/115, 117, 122, 102, 144, DIG. 1; 425/470, 184, 298; 426/496, 653; D7/672

[56] References Cited

U.S. PATENT DOCUMENTS

| | | | |
|---|---|---|---|
| D. 257,202 | 10/1980 | Schessl | D7/672 |
| D. 341,987 | 12/1993 | Erickson | D7/672 X |
| 2,691,337 | 10/1954 | Forrest | 99/426 |
| 4,345,516 | 8/1982 | Sinclair | 99/426 |
| 4,433,001 | 2/1984 | Weimer et al. | 99/426 X |
| 4,488,479 | 12/1984 | Sloan et al. | 99/352 X |
| 4,522,117 | 6/1985 | Weimer et al. | 426/523 X |
| 4,522,580 | 6/1985 | Poister | 425/470 X |
| 4,607,569 | 8/1986 | Murphy | 99/426 |
| 4,873,922 | 10/1989 | Umholtz | 99/430 X |
| 5,052,430 | 10/1991 | Trautwein | 99/428 X |
| 5,062,356 | 11/1991 | Frankowski | 99/428 |
| 5,229,564 | 7/1993 | Chiba | 426/107 |
| 5,230,155 | 7/1993 | Patenaude | 99/426 X |
| 5,230,156 | 7/1993 | Patenaude | D7/672 X |
| 5,255,595 | 10/1993 | Higgins | 99/378 |
| 5,269,787 | 12/1993 | Cozean, Jr. et al. | 99/353 |

Primary Examiner—Timothy F. Simone
Attorney, Agent, or Firm—William G. Forster

[57] ABSTRACT

The invention is an expandable volume food preparation tool for precisely and quickly forming a quantity of dough into a plurality of uniform dough blocks having a predetermined volume and shape. Included therein is a base plate having a base opening disposed therethrough. The base opening is defined by a continuous substantially vertical interior base sidewall arranged to define a predetermined outline shape. A base volume is defined by the void enclosed by the base sidewall. To enable the user to manipulate the base plate, a handle is mounted to the base plate. Additionally, a removable primary extension plate is mounted to the base plate. The primary extension plate includes an extension opening defined by a continuous, substantially vertical, interior extension sidewall arranged to define an outline shape substantially identical to the outline shape of the base opening. An extension volume is defined by the void enclosed by the extension sidewall within the primary extension plate. In the preferred embodiment, the primary extension plate is removably mounted to the upper surface of the base plate such that the interior extension sidewall is aligned with the base sidewall.

12 Claims, 3 Drawing Sheets

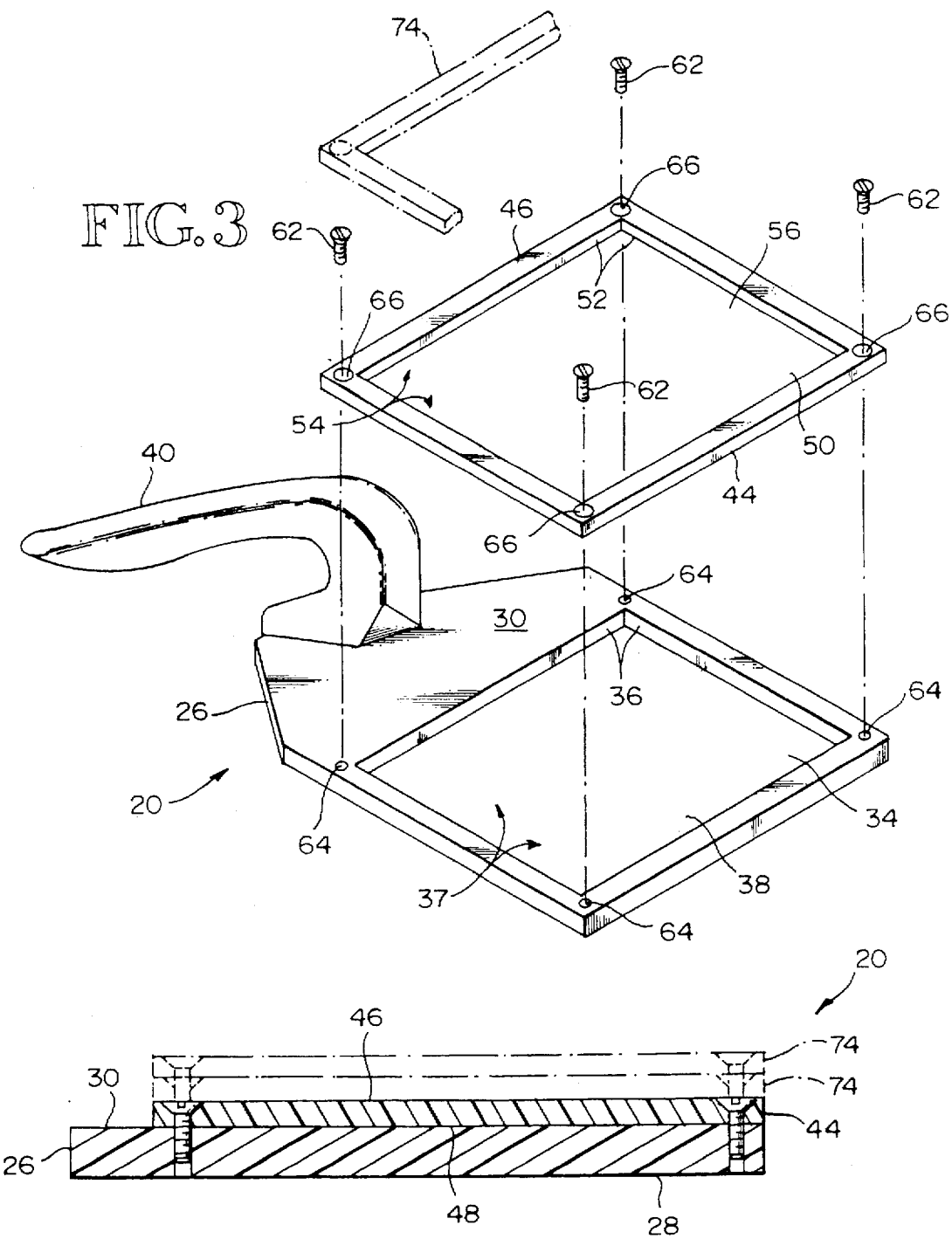

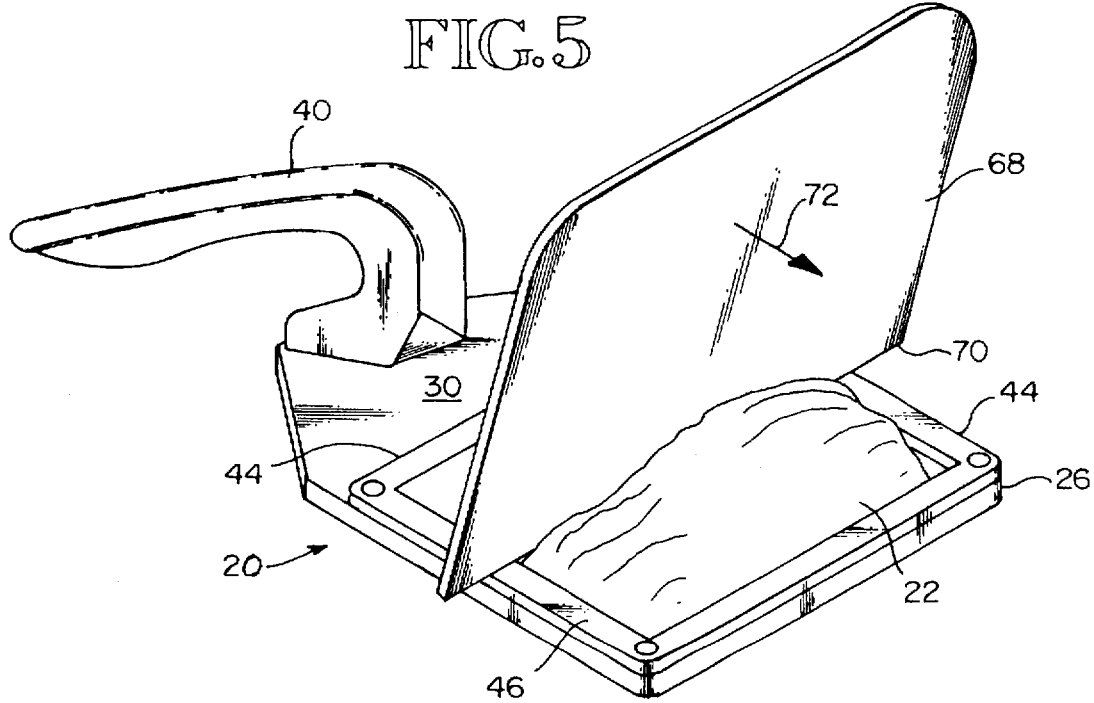
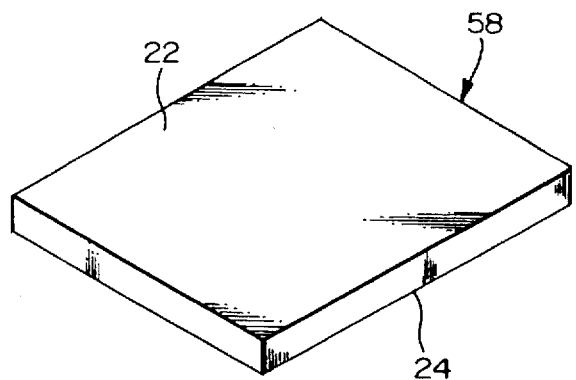

EXPANDABLE VOLUME FOOD PREPARATION AND FORMING TOOL APPARATUS AND METHOD

BACKGROUND

This invention relates generally to tools employed in the preparation of food, and more particularly to tools provided for quickly forming a plurality of uniform dough blocks having a predetermined volume and shape.

Tools and utensils employed for measuring and forming paste and batter mixtures in preparation of cooking the same, including dough mixes and Mexican-style tamale masa mixes, are well known in the food preparation art. Such tools are designed with many different arrangements and variations to produce a variety of patterns. Nevertheless, most such tools are limited by their inflexibility to be modified to produce more than one form and/or volume of a food product.

For example, one early design for forming a pie shell is illustrated in U.S. Pat. No. 2,691,337 which issued in 1954 to Forrest. The Forrest patent discloses a pie-making utensil comprising a combined pie crust forming member and pie tin. Although the Forrest device is readily employed to form a pie crust from a mix, it is difficult to produce a plurality of pie crusts having precisely the same thickness and consistency. Further, the Forrest device cannot be modified to produce pie crusts having varying precise thickness'.

A more recent device is illustrated in a U.S. Design Patent D257202 issued to Schessl in 1980. The Schessl invention is directed to an egg cooking frame having an enclosed area for placement of an egg. In this way, the Schessl device allows the user to accurately form a predetermined volume of egg or other food component. However, the Schessl design does not allow the user to modify or alter the tool to vary the volume of the resulting food product.

Similarly, U.S. Pat. Nos. 4,345,516 to Sinclair and 5,062,356 to Frankowski disclose cookie forming devices for placing cookie dough therein to form the resulting cookie shape. However, like the earlier designs noted above, these devices cannot be modified or changed to produce a variety of cookie dough blocks having more than one predetermined thickness and volume. Specifically, they are limited to producing dough blocks of one thickness only.

A more recent design is disclosed in U.S. Pat. No. 5,230,156 issued to Patenaude in 1993. Patenaude discloses a cooking utensil having a base plate including an extension flange mounted and hinged thereto downwardly from the base plate. The extension flange is provided to accommodate cooking pans and the like and position the base plate in a spaced relationship thereover. Like the designs that came before however, the Patenaude cooking utensil does not accommodate modification of the same to produce dough blocks of more than one thickness'.

SUMMARY

One object of the present invention is to quickly measure, shape and distribute a predetermined volume of dough or masa mix for use as the shell of a Mexican style-tamale.

A second object of the present invention is to facilitate modification of the tool to increase or decrease the volume of dough mix that is formed by the food preparation tool.

Another object, of the present invention is to allow the user to quickly modify the food preparation tool to produce a plurality of dough block having varying thickness'.

Yet another object is to provide an inexpensive food preparation tool that can be modified to produce varying forms of food component.

A further object of the invention is to enable the user to produce a plurality of uniform dough blocks having a precise amount of dough mix.

Still another object is to minimize the number of tools necessary to produce a plurality of dough blocks having varying thickness'.

The invention is a hand-held expandable volume food preparation tool for quickly forming a quantity of dough into a plurality of dough blocks that have a predetermined volume and shape. The tool comprises a base plate having a planar lower surface, and a planar parallel upper surface. The base plate includes a base opening defined by a continuous interior base sidewall that is disposed between the lower surface and the upper surface, extending therebetween in a direction substantially normal to the upper and lower surfaces. The continuous base sidewall is arranged to define a predetermined base outline shape, wherein a base volume is defined by the void enclosed within the interior base sidewall between the upper and lower surfaces.

So that the user can manipulate the base plate to a desired position and placement on a horizontal surface, a handle is mounted to the base. In order to add versatility to the food preparation tool, a removable primary extension plate is employed. The primary extension plate includes a planar first surface, and a spaced-apart parallel planar second surface. Additionally, the primary extension plate includes an extension opening defined by a continuous interior extension sidewall that is disposed between the first surface and the second surface, extending therebetween in a direction substantially normal to the first and second surfaces. The interior extension sidewall is arranged to define an extension outline shape substantially identical to the base outline shape. An extension volume is defined by the void enclosed by the interior extension sidewall within the primary extension plate. In this way, the primary extension plate can be removably mounted to either the upper or the lower surface of the base plate such that the interior extension sidewall is aligned with the interior base sidewall. With this arrangement, the base volume and the adjacently disposed extension volume combine to create a predetermined tool volume for measuring and forming dough into a dough block having a predetermined volume.

In another aspect of the invention a method of making an expandable volume hand-held food preparation tool is disclosed. The method of making an expandable volume hand-held food preparation tool is straight forward and includes generally the following steps. First a base plate is formed having a planar lower surface for placement on a substantially horizontal flat working surface, and a planar parallel upper surface. A rectangular base opening is then formed through the base plate extending from the lower surface to the upper surface. The base opening is defined by a continuous interior base sidewall that is disposed between the lower surface and the upper surface, extending therebetween in a direction substantially normal to the lower and upper surfaces. The void within the base opening, between the upper and lower surface, forms the base volume. A handle is mounted to the base plate for manipulating the same to a desired position by the user.

A primary extension plate for expanding the tool volume is provided. The primary extension plate having a planar first surface and a spaced-apart parallel planar second surface is formed with an extension opening disposed therethrough. The extension opening being defined by a continuous interior extension sidewall that is disposed between the first surface and the second surface, extending therebetween in a direction substantially normal to the first and second surfaces. The extension opening being substantially identical to the base opening.

The void disposed within the extension opening forms the extension volume. The extension plate is then mounted to the base plate, on to either the upper or lower surface such that the base opening and the extension opening are aligned. In this way, the base volume is combined with the extension volume to form the tool volume. Because a plurality of extension plates having various thickness' can be employed with the base plate, a wide range of tool volumes can be achieved thereby increasing the versatility of the food preparation tool.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3 is an exploded perspective view of an expandable volume food preparation tool illustrating a removable primary extension plate removed from the base plate with the phantom lines showing a fragmentary secondary extension plate disposed above the primary extension plate, the vertical broken lines indicating the fastening points for screws.

FIG. 4 is a cross-sectional view taken along lines 4—4 illustrating a primary extension plate removably mounted to the base plate of an expandable volume food preparation tool with phantom lines indicating placement of additional secondary extension plates to increase the tool volume.

FIG. 5 is a perspective view of an expandable volume food preparation tool having a quantity of dough disposed within the tool volume, wherein a blade is being moved in the direction of the arrow to remove excess dough thereby forming a dough block having a volume equal to the tool volume.

FIG. 6 is a perspective view of a dough block made from a quantity of dough by an expandable volume food preparation tool.

DETAILED DESCRIPTION OF PREFERRED EMBODIMENT

Figure 1:
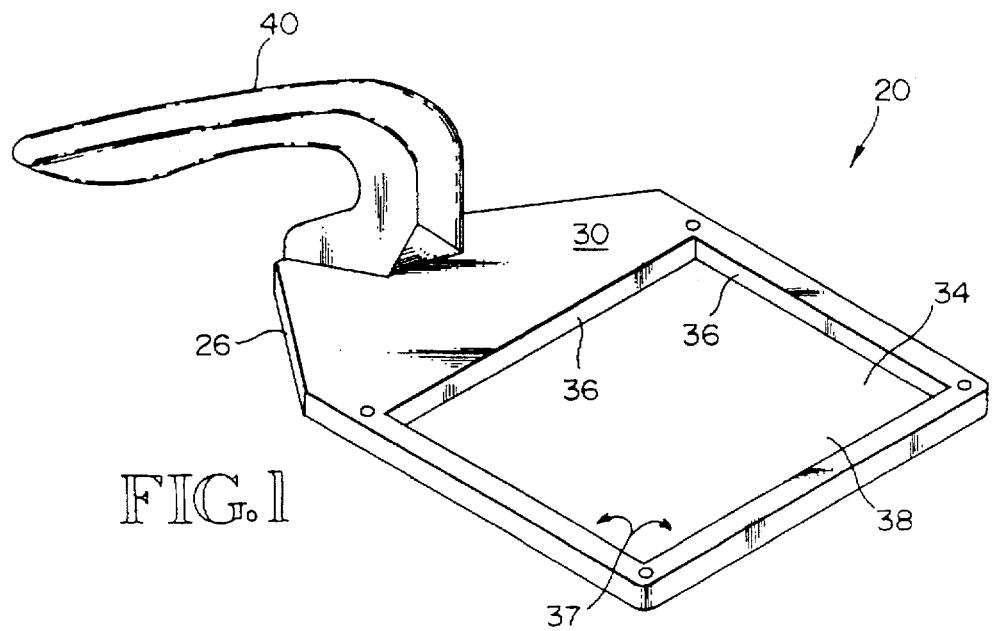
FIG. 1 is a perspective view of a preferred embodiment expandable volume food preparation tool having a base plate with a centrally located portion thereof removed to form a base volume. The base volume being enclosed by a interior base sidewall that defines a base outline shape in the form of a rectangle.
Figure 2:
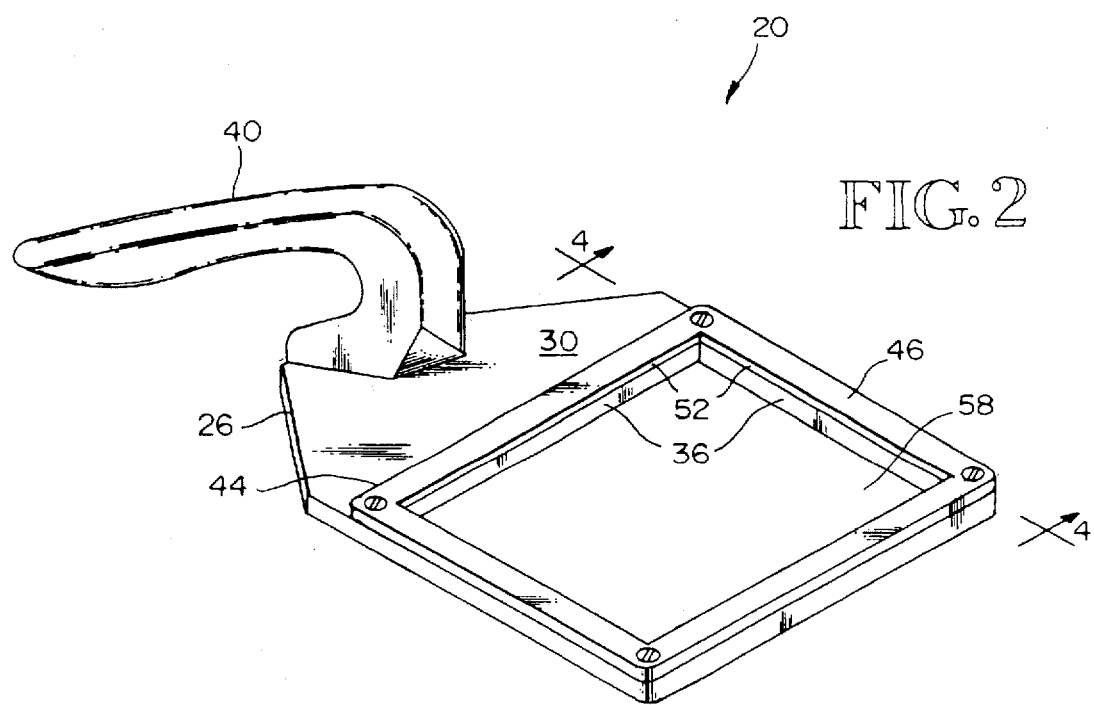
FIG. 2 is a perspective view of an expandable volume food preparation tool having a removable primary extension plate mounted thereon.

FIGS. 1 through 5 show a preferred embodiment of a hand held expandable volume food preparation and forming tool hereinafter referred to as an expandable food preparation tool 20. The invention is provided to enable the user to quickly form a plurality of dough blocks 24 having a predetermined volume and shape, from a quantity of dough 22. The dough blocks 24 are so formed to provide the outer shell of a Mexican style tamale (not illustrated) prior to the assembly and cooking thereof. It should be noted that the dough 22 referred to above is more commonly called "mesa" when employed for use in the preparation of a Mexican style tamale.

The expandable food preparation tool 20 comprises a base plate 26 having a planar lower surface 28, and a planar parallel upper surface 30. The base plate 26 includes a base opening 34 defined by a continuous interior base sidewall 36 that is disposed between the lower surface 28 and the upper surface 30, extending in a direction substantially normal thereto, i.e., substantially vertical. The interior base sidewall 36 is continuous, i.e., endless, to define a predetermined base outline shape 37. In the preferred embodiment, the predetermined base outline shape 37 is rectangular as illustrated in FIGS. 1 through 5. With this configuration, a base volume 38 is defined by the void enclosed by the interior base sidewall 36.

So that the user {not illustrated} can manipulate the base plate 26 to a desired position, and for placement thereof on a horizontal surface (not illustrated), a handle 40 is mounted to the base plate 26. In order to add versatility to the expandable food preparation tool 20, a removable primary extension plate 44 is employed by mounting the same to the base plate 26 (FIGS. 2–5). The primary extension plate 44 includes a planar first surface 46, and a spaced-apart parallel planar second surface 48.

Additionally, the primary extension plate 44 includes an extension opening 50 defined by a continuous interior extension sidewall 52 that is disposed between the first surface 46 and the second surface 48, extending in a direction substantially normal to the first and second surfaces 46–48. The interior extension sidewall 52 is arranged to define an extension outline shape 54 that is substantially identical to the base outline shape 37 of the base opening 34.

An extension volume 56 is defined by the void enclosed by the interior extension sidewall 52 within the primary extension plate 44. In this way, the primary extension plate 44 can be removably mounted to either of the upper or lower surfaces 28–30 of the base plate 26 such that the interior extension sidewall 52 is aligned with the interior base sidewall 36. With this arrangement, the base volume 38 and the adjacently disposed extension volume 56 combine to create a predetermined tool volume 58 for measuring and forming dough 22 into a dough block 24 having a volume equal to the tool volume 58.

Considering now in more detail the structure of the components from which an expandable food preparation tool 20 is constructed, a base volume 38 is defined by the void enclosed by the interior base sidewall 36. More specifically, the base volume 38 is the volume defined by the enclosed space that is bounded on its perimeter by the interior base sidewall 36, and is bounded above by a plane defined by the upper surface 30 of the base plate 26, and is bounded below by a plane defined by the lower surface 28 of the base plate 26.

Additionally, a base outline shape 37 is defined by the shape of the interior base sidewall 36 as viewed from directly above (plan view) or from directly below the base plate 26. In the preferred embodiment, the base outline shape 37 is a rectangle. In the preferred embodiment, the interior base sidewall 36 is substantially normal to the lower and upper surfaces 28–30, i.e. at a 90 degree angle to the upper and lower surface 28–30. Accordingly, the base outline shape 37 is the projection of the interior base sidewall 36 onto a planar surface, such as a working surface (not illustrated) that is parallel to the upper or lower surface 28–30. It should be noted that the base outline shape 37 is of a specific size as well as shape. To put it differently, a tracing of the interior base sidewall 36 defines a "footprint" of definite size as well as shape. As will be seen below, a rectangular base outline shape 37 produces a rectangular dough block. It should be noted that the base outline shape 37 could be circular, triangular or any other desired shape.

Turning now to FIG. 3, a primary extension plate 44 is illustrated above and adjacent to the base plate 26. A primary extension plate 44 is so disposed to enable the user to vary the thickness of the dough blocks 24 by choosing a primary extension plate 44 of a predetermined thickness. Similar to the base plate 26, the primary extension plate 44 includes an extension volume 56. The extension volume 56 is defined by the void enclosed by the interior extension sidewall 52. Specifically, the extension volume 56 is the volume defined by the enclosed space that is bounded on its perimeter by the interior extension sidewall 52, and is bounded above by a plane defined by the first surface 46, and is bounded below by a plane defined by the second surface 48.

Moreover, similar to the base outline shape 37 of the base plate 26, an extension outline shape 54 is defined by the shape of the interior extension sidewall 52 as viewed from directly above (plan view) or from directly below the primary extension plate 44. Similarly, because interior extension sidewall 52 is normal to the first and second surface 48–50, the extension outline shape 54 is the projection of the interior extension sidewall 52 onto a parallel planar surface.

In the preferred embodiment, the extension outline shape 54 is identical to the base outline shape 37. In this way the primary extension plate 44 can be positioned adjacent the upper surface 30 or the lower surface 28 of the base plate 26 such that the interior extension sidewall 52 is aligned with the interior base sidewall 36. In other words, the interior extension sidewall 52 is coplanar with the interior base sidewall 36. Accordingly, the base volume 38 is combined with the extension volume 56 to form a tool volume 58 which determines the volume, and thickness of a dough block 24.

Importantly, the thickness of the primary extension plate 44 can be varied to produce a variety of different tool volumes 58. Further, additional secondary extension plates 74 can be employed, as illustrated in FIGS. 3–4 by phantom lines, which show a secondary extension plate 74. It should be noted that the construction of the secondary extension plate 74 is in most respects identical to the construction of the primary extension plate 44: the foremost difference being the thickness of the secondary extension plate 74. Additionally, one or more secondary extension plates 74 can be stacked atop the primary extension 44 to further increase the tool volume 58. To facilitate this, the secondary extension plates 74 are constructed and configured the same as the primary extension plate 44: the only difference being the thickness of the secondary extension plate 74 which is determined by the user to produce a dough block 24 of a specific thickness.

Directing attention again to FIG. 3, it can be seen that the primary and secondary plates 44 and 74 are fastened to the base plate via common threaded fasteners 62. Specifically, at each corner of the base plate 26, a threaded bore 64 is provided. Similarly, at each corner of the extension plates is a corresponding bore 66 through which a threaded fastener 62 is guided and threadedly engaged with the corresponding threaded bore 64 of base plate 26. Accordingly, a plurality of extension plates can be stacked one atop the other thereby expanding the thickness of the expandable food preparation tool 20 and therefore the tool volume 58.

Turning now to FIGS. 5–6, a dough block 24 having a specific thickness and volume is produced. To do so, the user chooses the proper combination of primary and secondary extension plates 44 and 74 and fastens them to the base plate 26. Then an excess amount of dough 22 is placed within the tool volume 58. The dough 22 is then compacted and spread to fill the tool volume 58. Following this the user employs the straight edge 70 of a blade 68 to scrape off the extra dough 22. The scraping motion is indicated by arrow 72. The expandable food preparation tool 20 is then lifted from the working surface to leave a finished dough block 24. In some situations, it may be necessary to insert a blade or knife (not illustrated) between the dough block 24 and the interior sidewall 36 and 52 to loosen the dough 24 therefrom prior to removal of the dough block 24.

In another aspect of the invention a method of making an expandable volume hand-held food preparation tool 20 is disclosed. The method of making an expandable volume hand-held food preparation tool 20 is straight forward and includes generally the following steps. First a base plate 26 is formed having a planar lower surface 28 for placement on a substantially horizontal flat working surface (not illustrated), and a planar parallel upper surface 30. A rectangular base opening 34 is then formed through the base plate 26 extending from the lower surface 28 to the upper surface 30. The base opening 26 is defined by a continuous interior base sidewall 36 that is disposed between the lower surface 28 and the upper surface 30, extending therebetween in a direction substantially normal to the lower and upper surfaces 28–30. The void within the base opening 26, between the upper and lower surface 28–30, forms the base volume 38. A handle 40 is mounted to the base plate 26 for manipulating the same to a desired position by the user.

A primary extension plate 44 for expanding the tool volume 58 is provided. The primary extension plate 44 having a planar first surface 46 and a spaced-apart parallel planar second surface 48 is formed with an extension opening 50 disposed therethrough. The extension opening 50 being defined by a continuous interior extension sidewall 52 that is disposed between the first surface and the second surface 46–48, extending therebetween in a direction substantially normal to the first and second surfaces. The extension opening 50 being substantially identical to the base opening 34.

The void disposed within the extension opening forms the extension volume 56. The extension plate is then mounted to the base plate 26, onto either the upper or lower surface 28–30 such that the base opening 34 and the extension opening 50 are aligned. In this way, the base volume 38 is combined with the extension volume 56 to form the tool volume 58. Because a plurality of extension plates having various thickness' can be employed with the base plate 26, a wide range of tool volumes can be achieved thereby increasing the versatility of the food preparation tool. It should be noted that in the preferred embodiment, the components of the expandable food preparation tool are constructed primarily of plastic. However, many other materials, including wood and metals, could be substituted with no adverse effect.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A hand-held expandable volume food preparation tool for quickly forming a quantity of dough into a plurality of dough blocks having a predetermined volume and shape, the tool comprising:

a base plate having a planar lower surface, and a planar parallel upper surface, the base plate having a base opening defined by a continuous interior base sidewall that is disposed between the lower surface and the upper surface, extending therebetween in a direction substantially normal to the lower and upper surfaces, the interior base sidewall being arranged to define a predetermined base outline shape, wherein a base volume is defined by the void enclosed by the base sidewall;

a handle mounted to the base plate for manipulating the same to a desired position;

a removable primary extension plate having a planar first surface, and a spaced-apart parallel planar second surface, the primary extension plate having an extension opening defined by a continuous interior extension sidewall that is disposed between the first surface and the second surface, extending therebetween in a direction substantially normal to the first and second surfaces, the extension sidewall being arranged to define an outline shape substantially identical to the outline shape of the base opening, wherein an extension volume is defined by the void enclosed by the extension sidewall within the primary extension plate; and wherein the primary extension plate is removably mounted to one of said upper and lower surfaces of the base plate such that the extension sidewall is aligned with the base sidewall, wherein the base volume and the adjacently disposed extension volume combine to create a predetermined tool volume for measuring and forming dough into a dough block having a predetermined volume.

2. A food preparation tool as recited in claim 1 wherein the primary extension plate is removably mounted to the upper surface of the base plate.

3. A food preparation tool as recited in claim 2 further comprising a secondary extension plate having a secondary extension opening, the secondary extension plate being removably mounted to the primary extension plate such that the tool volume is further expanded.

4. A food preparation tool as recited in claim 3 wherein the outline shape of the base opening is rectangular.

5. A food preparation tool as recited in claim 1 wherein the primary extension plate is removably mounted to the lower surface of the base plate.

6. A food preparation tool as recited in claim 5 further comprising a secondary extension plate having a secondary extension opening, the secondary extension plate being mounted to the base plate such that the tool volume is further expanded.

7. A food preparation tool as recited in claim 6 wherein the outline shape of the base opening is rectangular.

8. A food preparation tool as recited in claim 1 wherein the outline shape of the base opening is rectangular.

9. A method of making an expandable volume hand-held food preparation tool for quickly forming a quantity of dough into a plurality of dough blocks having a predetermined volume and shape, the method comprising the steps:

providing a base plate having a planar lower surface for placement on a substantially horizontal flat working surface, and a planar parallel upper surface;

forming through the base plate a rectangular base opening extending from the lower surface to the upper surface, the base opening defining an interior base sidewall that extends from the lower surface to the upper surface in a direction normal thereto, the interior base sidewall being arranged to define a predetermined base outline shape, wherein a base volume is defined within the base opening between the lower and upper surfaces;

mounting a handle to the base plate for manipulating the same to a desired position;

providing a primary extension plate, the primary extension plate having a planar first surface, and a spaced-apart parallel planar second surface;

forming, through the primary extension plate, an extension opening that extends from the first surface to the second surface, the extension opening defining a interior extension sidewall that extends from the first surface to the second surface in a direction normal thereto, the extension sidewall being arranged to define an outline shape substantially identical to the outline shape of the base opening, wherein an extension volume is defined by the void enclosed by the extension sidewall within the primary extension plate; and removably mounting the primary extension plate to the upper surface of the base plate such that the sidewalls of the base opening align with the sidewalls of the extension opening, wherein the base volume and the adjacently disposed extension volume combine to create a tool volume for measuring and forming dough into a dough block having a predetermined volume.

10. A method of making an expandable volume hand-held food preparation tool as recited in claim 9, the method further comprising the step of providing a secondary extension plate having a secondary extension opening, the secondary extension plate being removably mounted to the primary extension plate such that the tool volume is further expanded.

11. A method of making an expandable volume hand-held food preparation tool as recited in claim 9, the method further comprising the step of providing a secondary extension plate having a secondary extension opening, the secondary extension plate being removably mounted to the base plate such that the tool volume is further expanded.

12. A method of making an expandable volume hand-held food preparation tool as recited in claim 9 wherein the outline shape of the base opening is rectangular.

* * * * *